United States Patent
Ghoneim

(10) Patent No.: US 8,370,038 B2
(45) Date of Patent: Feb. 5, 2013

(54) VEHICLE SUBSYSTEM CONTROL METHOD AND APPARATUS

(75) Inventor: Youssef Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 870 days.

(21) Appl. No.: 12/293,418

(22) PCT Filed: Mar. 21, 2007

(86) PCT No.: PCT/EP2007/002519
§ 371 (c)(1),
(2), (4) Date: Sep. 17, 2008

(87) PCT Pub. No.: WO2007/107363
PCT Pub. Date: Sep. 27, 2007

(65) Prior Publication Data
US 2009/0099727 A1    Apr. 16, 2009

(30) Foreign Application Priority Data

Mar. 22, 2006 (DE) .......................... 10 2006 013 572
Mar. 22, 2006 (DE) .......................... 10 2006 013 580
Mar. 22, 2006 (DE) .......................... 10 2006 013 621

(51) Int. Cl.
*G06G 7/76* (2006.01)
*G06F 7/00* (2006.01)
(52) U.S. Cl. .......................... 701/70; 701/36
(58) Field of Classification Search ............ 701/36, 701/70, 74, 48; 180/197, 282
See application file for complete search history.

(56) References Cited

U.S. PATENT DOCUMENTS

| 5,157,609 A | 10/1992 | Stehle et al. | |
| 6,449,572 B1 * | 9/2002 | Kurz et al. | 702/94 |
| 7,349,776 B2 * | 3/2008 | Spillane et al. | 701/36 |

FOREIGN PATENT DOCUMENTS

| DE | 10323723 A1 | 12/2004 |
| DE | 102004019337 A1 | 11/2005 |
| EP | 0406615 A2 | 1/1991 |
| EP | 1335209 A1 * | 10/2003 |
| EP | 1355209 A1 | 10/2003 |
| JP | 4002518 A | 1/1992 |
| JP | 2003312410 A2 | 11/2003 |
| RU | 2117199 C1 | 8/1998 |
| RU | 2127951 C1 | 3/1999 |

OTHER PUBLICATIONS

ISA EPO, International Search Report for Application No. PCT/EP2007/002519, dated Aug. 1, 2007.
Chinese Patent Office, Chinese Office Action for Application No. 2007800101710, dated May 16, 2012.

* cited by examiner

Primary Examiner — Paul N Dickson
Assistant Examiner — Joselynn Y Sliteris
(74) Attorney, Agent, or Firm — Ingrassia Fisher & Lorenz, P.C.

(57) ABSTRACT

A method is provided for controlling at least one active subsystem in a vehicle chassis. The method includes, but is not limited to the steps of evaluating a driver's driving style based on data (ax(K), ay(K)) representative of acceleration of the vehicle and setting an operating state of the subsystem according to the driving style.

18 Claims, 3 Drawing Sheets

VEHICLE SUBSYSTEM CONTROL METHOD AND APPARATUS

CROSS-REFERENCE TO RELATED APPLICATIONS

This application is a U.S. National-Stage entry under 35 U.S.C. §371 based on International application No. PCT/EP207/002519, filed Mar. 21, 2007, which was published under PCT Article 21(2) and which claims priority to German Application No. 102006013580.6, filed Mar. 22, 2006 and which claims priority to German Application No. 102006013572.5, filed Mar. 22, 2006, and which claims priority to German Application No. 102006013621.7, filed Mar. 22, 2006, which are all hereby incorporated in their entirety by reference.

TECHNICAL FIELD

The present invention relates to a method for controlling at least one active subsystem in a vehicle chassis and to an apparatus for carrying out the method.

BACKGROUND

Modern vehicles comprise a large number of active subsystems which have substantial influence on the way in which the vehicle reacts to driver input such as steering wheel or pedal operations, affecting not only the way in which a driver "feels" the vehicle, but also the safety of driving. From EP 1355209 A1, a motor vehicle is known in which subsystems such as an engine controller, a transmission controller, a steering controller, a break controller, and an air suspension controller can assume different operating states under the control of a master controller. This master controller can receive direct input from a user (e.g., via a switch) which allows the user to specify a type of ground on which the vehicle is moving, and operating modes such as normal, sport and towing modes. In one embodiment of this document, the vehicle mode controller uses information relating to the manner in which the vehicle is being driven, and the way in which the vehicle is being used, to select an appropriate mode automatically. A power train controller and steering angle sensor can be used to classify the driving style as normal or sporty. The only disclosed function of the power train controller is the distribution of drive torque between front and rear wheels. A judgment of the drive mode based on the steering angle sensor is likely to produce errors, since the steering wheel sensor cannot distinguish between steering wheel operations when driving fast on a curved road and steering wheel operations when maneuvering into or out of a parking space.

Accordingly, there is a need for a method for controlling active subsystems in the vehicle chassis, which allows for a reliable judgment of the driving style, and for apparatus for carrying out such a method. In addition, other needs, desirable features, and characteristics will become apparent from the subsequent summary and detailed description and the appended claims, taken in conjunction with the accompanying drawings and this background.

SUMMARY

The present invention satisfies this need by a method for controlling at least one active subsystem in a vehicle chassis, comprising the steps of evaluating a divers driving style and setting an operating state of the subsystem according to the driving style, characterized in that the driving style is evaluated based on data representative of acceleration of the vehicle.

Preferably, such data should be representative of an acceleration normalized with respect to an acceleration threshold. This acceleration threshold should be related to a safe acceleration limit, i.e. an acceleration at which the vehicle will not be caused to slip.

Not only should a normalized longitudinal acceleration of the vehicle be taken into account, but also a normalized lateral acceleration, i.e., an acceleration perpendicular to the direction of motion of the vehicle, which occurs when driving curves.

In order to enable a simple judgment of the driving style, preferably a scalar driving style descriptor is calculated based on the accelerations, so that the driving style can be judged by simply comparing the driving style descriptor to a threshold.

In order to establish a close relation between the numerical value of the driving style descriptor and the amount of acceleration, regardless of its direction, the calculation of the driving style descriptor preferably comprises the step of calculating the sum of the squares of the normalized accelerations.

It is further preferred to take account not only of the total amount of the acceleration, but also of its rate of change, when evaluating the driving style.

To this effect, a first term representative of average accelerations and a second term representative of average rates of change of the acceleration may be calculated, and the driving style descriptor may be calculated by forming a sum of the two terms.

If the data representative of acceleration of the vehicle are gathered at a constant rate, a problem arises that a given trajectory, if driven at low speed, will produce more data and thus have a higher weight in the evaluation of the driving style than the same trajectory driven at high speed. This problem is overcome by weighting the data, or, more specifically, the first and/or second terms with a weighting factor which is progressively related to the vehicle speed.

A sporty driving style may involve high acceleration levels in combination with moderate steering wheel operations (e.g., when driving and, eventually, overtaking other vehicles on a motorway); another type of sporty driving may involve strong steering wheel operations at moderate speeds and acceleration levels (e.g., when driving along a tortuous mountain road). In order to enable a precise judgment in either case, it is advantageous that the above mentioned sum of the two terms is a weighted sum, weighting factors of which are determined based on steering wheel operations.

Preferably, the weighting factors are determined according to the rate of change of the steering wheel angle.

The method is applicable to a variety of active subsystems, such as an all-wheel drive controller, at least one state of which corresponds to an all-wheel drive mode being on, and at least one state of which corresponds to the all-wheel drive mode being off, and which should preferably be off in the sporty mode. Another possible type of subsystem is a shock absorber controller, states of which correspond to a different degree of shock damping. Here, the state associated to a sporty driving style should preferably correspond to a higher stiffness of the shock absorbers, so that the tires of the vehicle may keep a tighter hold on the ground. A power steering controller controlled according to the method of an embodiment of the invention may have states which differ by the degree of steering assistance they provide; in a general steering controller, there may be states which have different relations between steering wheel and front wheel turning angles. In a power train controller, there may be states which have different gear shifting characteristics. In a load controller for controlling motor load according to an accelerator pedal position, there may be states which correspond to different pedal position/load characteristics. In a brake controller, there may be states which have different relations between brake pedal position and braking force.

A motor vehicle for carrying out an embodiment of the present invention comprises a chassis having at least one active subsystem and a controller for setting an operating state of the subsystem according to a driver's driving style, the controller being adapted to evaluate the driving style based on data representative of acceleration of the vehicle.

An embodiment of the invention may further be embodied in a computer program product comprising program code means for enabling a computer, when the code is carried out on it, to execute the method as defined above.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
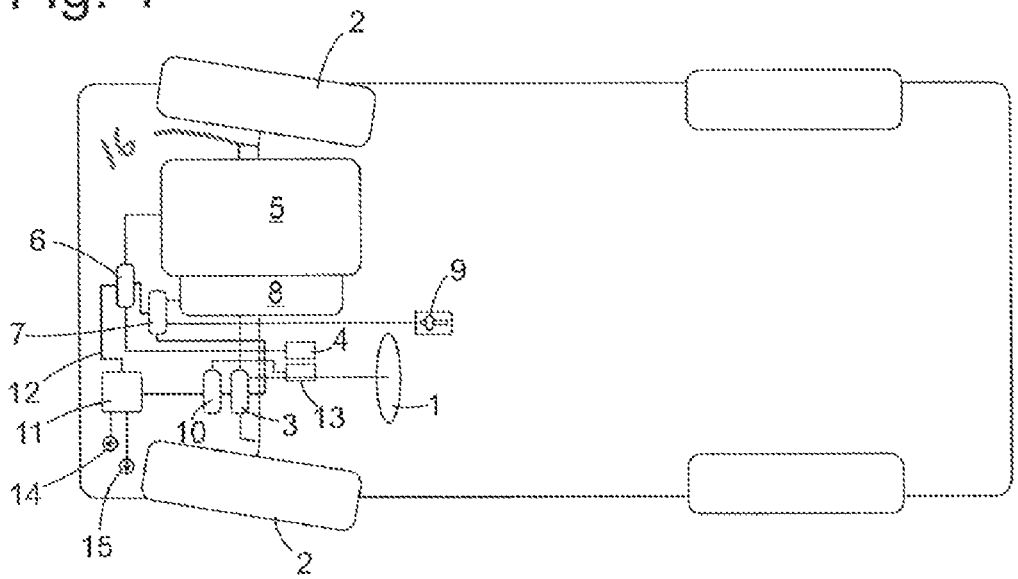
FIG. 1 is a block diagram of a motor vehicle according to an embodiment of the present invention.

FIG. 1 is a schematic diagram of a motor vehicle illustrating in block form some components which are relevant to an embodiment of the present invention. It should be understood that these components are not necessarily essential to the invention, and that the embodiment of the invention may be applicable to other components that those shown, too.

A steering wheel 1 controls the steering angle of front wheels 2 of the motor vehicle by means of a power steering controller 3. The power steering controller 3 has actors for turning the front wheels 2 in proportion to the angular position of steering wheel 1, and actors for exercising on the steering wheel 1 a counter-torque to a torque imposed by the driver. The power steering controller 3 supports a plurality of operating states which differ from each other by the degree of assistance provided to the driver (i.e., by the proportion between the torque applied by the actors to the front wheels and the counter-torque experienced by the driver). The power steering controller 3 further has a so-called Active Front Steering functionality (i.e., it supports a number of states having different ratios between the angle by which the driver turns steering wheel 1 and the corresponding yaw angle of the front wheels 2.

An accelerator pedal 4 controls the load of an engine 5 via an electronic engine controller 6. Engine controller 6 supports a plurality of states which use different characteristics for controlling the motor load as a function of the accelerator pedal position. For example, there may be a "calm" state in which the load varies little with the pedal position, and there may be a "dynamic" state in which the load varies strongly with the pedal position.

A transmission controller 7 controls a gearbox 8 based primarily on engine load and speed detected by sensors, not shown, at engine 5. A gearshift lever 9 is connected to the transmission controller 7, so as to enable the driver to choose between different states of the transmission controller 7, which use different algorithms for selecting the gear ratio in gearbox 8 based on engine speed and load, or for overriding a gear ratio selected by transmission controller 7.

The transmission controller 7 may also be adapted to switch over between a two-wheel drive state and a four-wheel drive state; either based on the input from the driver or automatically, based e.g. on driving speed.

Electronic brake controller 10 controls the reaction of brakes, not shown, provided at the vehicle wheels, to the driver pressing a brake pedal 13. The brake controller 10 may implement conventional brake control schemes such as an anti-blocking system or an electronic stability program ESP, and different states of the brake controller 10 may vary in the amount of wheel slippage permitted before the anti-blocking system or the ESP is activated.

A suspension controller 16 is provided for controlling the stiffness of the vehicle's wheel suspension, different states of the suspension controller corresponding to different degrees of rigidity it imposes upon shock absorbers of the wheels.

All these controllers 3, 6, 7, 10 are connected as sub-controllers or slave controllers to a master controller 11 by a bus system 12.

The bus system 12 may have a linear structure in which all controllers are connected in parallel to a same bus line and data transmitted on the bus by one of the controllers are received in parallel by all others.

In FIG. 1, the bus system 12 is shown to have an annular structure with bus segments extending from master controller 11 to engine controller 6, from engine controller 6 to transmission controller 7, and so on, and finally, from brake controller 10 back to master controller 11. In such a bus system, the master controller 11 can judge that data sent by it were received correctly by all other controllers, if these data, after making a complete turn on the bus system 12, are received uncorrupted at the master controller 11 again.

The task of the master controller 11 is to decide the various states that the sub controllers 3, 6, 7, 10 can assume based on driving behavior of the driver. The master controller 11 can be designed to support various operating modes, one in which it decides on the states of the sub controllers based on the driver's behavior, and others in which it decides based on data which the driver can input directly (e.g., by actuating switches). Using these switches (14, 15), the driver can specify external parameters that are relevant for the decisions taken by the master controller 11, such as road conditions (e.g., dry/wet, solid/sandy/muddy, towing/non-towing mode, 2-wheel drive/4-wheel drive, etc.). This latter operating mode of the master controller 11, being conventional, will not be described in detail.

Figure 2:
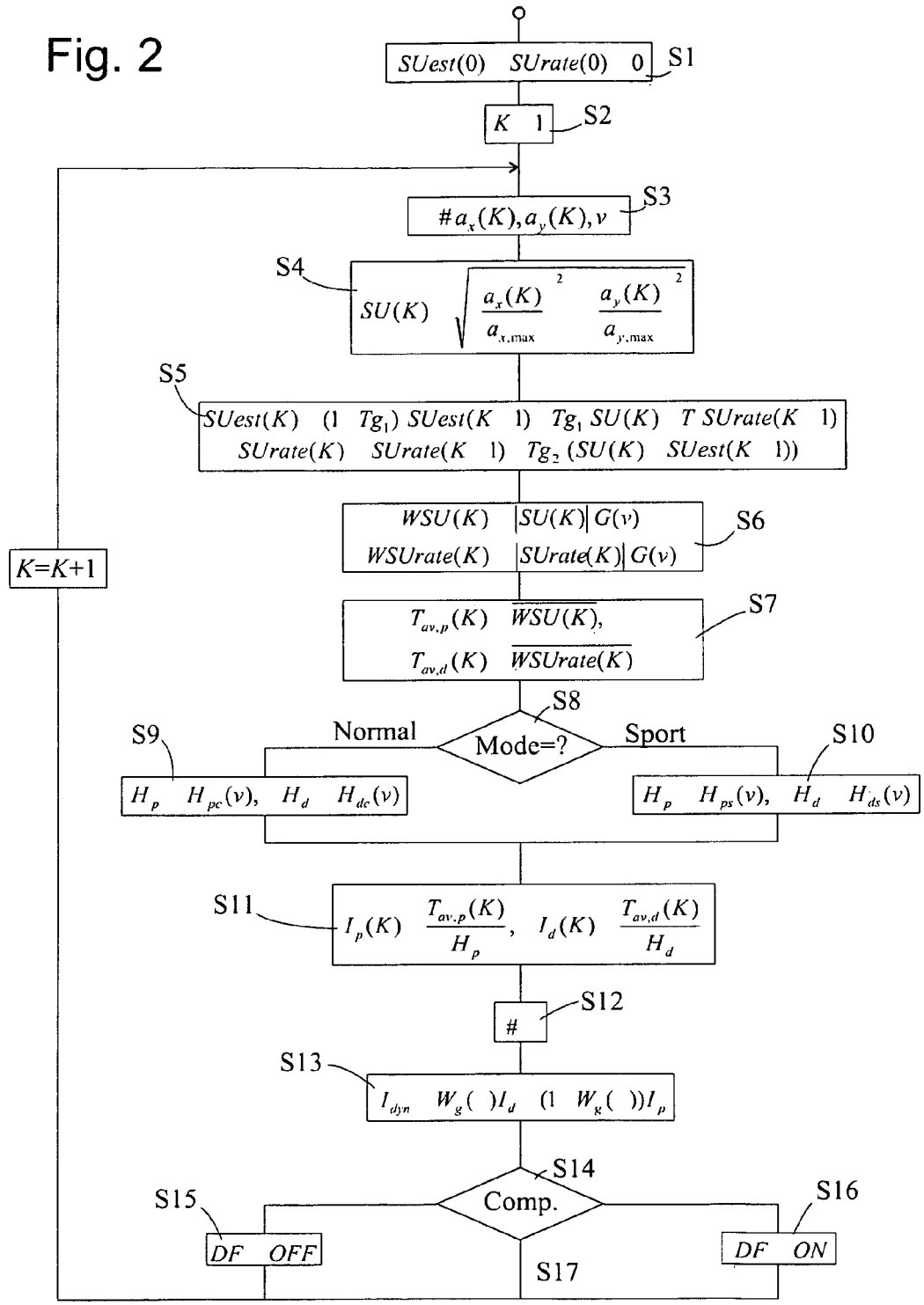
FIG. 2 is a flowchart of a control algorithm carried out by the controller of FIG. 1.

FIG. 2 illustrates a method carried out by the master controller 11 for judging the drivers driving style. A central notion of the method of FIG. 2 is the so called "surface utilization". The denomination of this term is derived from the idea that there is a limited range of longitudinal and lateral accelerations ($a_x$, $a_y$) in which the vehicle may operate safely, and in a diagram which has longitudinal and lateral accelerations as orthogonal axes, this area has the shape of an ellipsis. The surface utilization indicates how much use the driver makes of this safe area.

In an initializing phase of the method of FIG. 2, an estimated value, SUest, of the surface utilization and a time derivative thereof, SUrate, are set to zero in step S1, and a time counting index K is set to one in step S2.

In step S3, master controller 11 determines the longitudinal acceleration ax, the lateral acceleration ay and the vehicle speed v at instant K. In step S4, the detected acceleration values ax(K), ay(K) are normalized by the respective thresholds ax,max and ay,max, squared, added together, and the square root of the sum gives the surface utilization SU(K) at instant K:

$$SU(K) = \sqrt{\left(\frac{a_x(K)}{a_{x,max}}\right)^2 + \left(\frac{a_y(K)}{a_{y,max}}\right)^2} \quad (1)$$

Herein, ax,max and ay,max denote maximum longitudinal and lateral acceleration thresholds, which the driver should not exceed in order to keep precise control of the vehicle. These thresholds ax,max, ay,max can be predetermined for all conditions, or there can be various values of these thresholds stored in the master controller 11, which are selected by the master controller 11 according to road conditions. The road conditions can be input directly by the driver via any conventional man/machine interface, or they may be judged automatically by the controller 11 or an appropriate one of its associated sub-controllers based e.g. on detected wheel slip, on the activity of an ABS (anti-blocking) system, etc.

The surface utilization SU(K) calculated in step S4 is subject to errors due to inaccuracies in the measurement of ax and ay. In order to reduce the influence of such errors, an estimate of the true surface utilization SUest(K) is calculated in step S5 based on a floating average of previous surface utilizations and an extrapolation based on a previous derivative SUrate (K−1):

$$SUest(K)=(1-Tg_1)SUest(K-1)+Tg_1 SU(K)+TSUrate(K-1) \quad (2)$$

where T is the time interval between instants K−1 and K, i.e. between measurements of the acceleration in subsequent executions of step S3, and g1 is an arbitrary factor of e.g. approximately 20 Hz in case of a sampling interval T of approximately 10 ms.

The derivative of the surface utilization is calculated according to:

$$SUrate(K)=SUrate(K-1)+Tg_2(SU(K)-SUest(K-1)) \quad (3)$$

Where g2 is an arbitrary factor of e.g. approximately 12 Hz2.

If it is assumed that the sampling time interval T is constant, many more acceleration samples ax, ay will be taken on a path of given length if it is driven slowly than if it is driven fast, so that if the driving style is judged directly based SUest and SUrate, paths where the vehicle is driven slowly tend to be over weighted. In order to compensate this effect, the surface utilization and its derivative are weighted in step S6 by a speed dependent weighting factor G(v), an example of which is given in table 1, whereby a weighted surface utilization WSU(K) and a weighted derivative WSUrate(K) are obtained:

$$WSU(K)=|SU(K)|G(v)$$

$$WSUrate(K)=|SUrate(K)|G(v)$$

TABLE 1

| Weighting factor G(v) | | | | | | | |
|---|---|---|---|---|---|---|---|
| v(kph) | 0 | 10 | 50 | 70 | 100 | 150 | 200 |
| G(v) | 0 | 2.7 | 14 | 19 | 27 | 27 | 27 |

It can be seen that in a speed range below 100 kph G(v) is directly proportional to the vehicle speed. At a speed of 100 kph and above, G(v) is constant, in order to avoid overweighting of short time intervals driven at an exceptionally high speed.

In step S7, proportional and derivative average terms Tav,p(K) and Tav,d(K) are calculated based on the weighted surface utilization WSU(K) and the weighted derivative WSUrate(K).

$$T_{av,p}(K)=\overline{WSU(K)},$$

$$T_{av,d}(K)=\overline{WSUrate(K)}$$

Based on the operating mode currently set in the master controller, normal or sport, the method branches from step S8 either to S9 or S10. In either of these steps, divisors Hp, Hd are selected for the average terms Tav,p and Tav,d, according to the current vehicle speed (v) Tables in which these divisors are predetermined are stored in master controller 11. An example for a set of divisors Hpc, Hdc, Hps, Hds from which the divisors Hp, Hd are selected is given in table 2.

TABLE 2

| Divisors for normal and sport modes | | | | |
|---|---|---|---|---|
| V(kph) | 0 | 55 | 90 | 145 |
| Hps(v) | 5 | 4 | 3 | 3 |
| Hpc(v) | 7 | 6 | 5 | 4 |
| Hds(v) | 6 | 6 | 7.5 | 7.5 |
| Hdc(v) | 10 | 10 | 11 | 13 |

Using divisors Hp, Hd selected from table 2 according to speed and driving mode, proportional and derivative indices Ip, Id are calculated in step S11 according to:

$$I_p(K) = \frac{T_{av,p}(K)}{H_p},$$

$$I_d(K) = \frac{T_{av,d}(K)}{H_d} \quad (4)$$

As can be seen in table 2, divisors Hps, Hds associated to the sport mode are smaller than corresponding ones of divisors Hpc, Hdc associated to the normal mode, so that when driving in a similar manner in normal and sport modes, the resulting indices Ip, Id will be higher than in the normal mode. In this way, a hysteresis is implemented, thus avoiding unnecessary switchovers between normal and sport modes which might irritate the driver if they occurred too frequently. It can further be seen that the divisors Hps, Hpc for the proportional term decrease at increasing speed, whereas the divisors Hds, Hdc for the derivative term increase with speed. This has proved useful for obtaining a large spread of the numerical values of the indices Ip, Id according to the driver's style, so that a clear decision for one mode or the other can be based on these indices.

In step S12, the time derivative of the steering wheel angle δ̇ is calculated. For calculating this derivative, a method analogous to the calculation of the surface utilization derivative SUrate(K) in step S5 can be used.

Based on this derivative $\dot{\delta}$, it is possible to distinguish between two different types of sporty driving, one which involves high speeds but little cornering, such as highway driving, the other at moderate speeds but involving a lot of cornering. In order to enable the master controller 11 to recognize either of these styles quickly, a weighted sum of the indices Ip(K), Id(K) calculated in step 11 is formed in step S13 according to eq. (5).

$$I_{dyn} = W_g(\dot{\delta})I_d + (1 - W_g(\dot{\delta}))I_p \quad (5)$$

If the weighting factor Wg increases with, as illustrated by way of example in table 3,

TABLE 3

| Weighting factor Wg | | | | | | |
|---|---|---|---|---|---|---|
| $\dot{\delta}_{(deg/sec)}$ | 0 | 10 | 30 | 50 | 100 | 500 |
| Wg | 0.3 | 0.4 | 0.5 | 0.6 | 0.7 | 0.7 |

The proportional index Ip is over weighted if the steering angle rate is low (i.e., if the vehicle goes mainly straight ahead or along smooth long curves, as is typical for highway driving), whereas if there is a lot of cornering in varying directions, the derivative term is over weighted. In this way, a simple, scalar dynamic driving index Idyn is obtained by which the driving style of a driver can be classified as normal or sporty based on a simple comparison to a threshold in step S14. As a result of this comparison, a dynamic driving flag DF can be set to OFF in S15 if Idyn is below a first threshold, it may be set to ON in S16 if Idyn is above another second threshold, or it may be left unchanged (S17) if the index Idyn is between these two thresholds.

Figure 3:
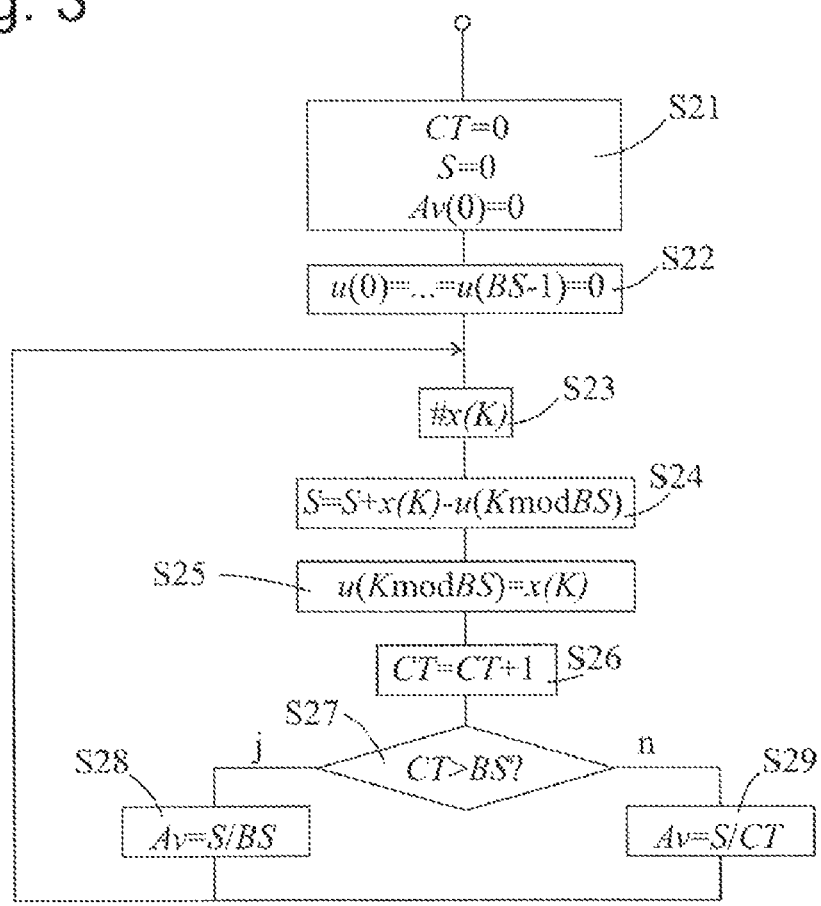
FIG. 3 is a flowchart showing in detail a step of the method of FIG. 2.

FIG. 3 illustrates the calculation of an average of a quantity x in the master controller 11, which quantity may be the weighted surface utilization WSU or the weighted derivative WSUrate of step S7 or the derivative of steering wheel angle δ in step S12. When the loop of steps S3 to S16 of FIG. 2 is carried out for the first time, the average calculation method of FIG. 3 involves initialization steps S21, in which a counter CT, a sum S and an average av are set to 0, and S22, in which cells u(0), u(1), . . . , u(BS−1) of a buffer comprising BS cells are set to zero.

In step S23, a sample x(K) of the quantity x to be averaged is obtained

In step S24, the sum S is incremented by x(K) and decremented by buffer element u(KmodBS). As long as the count CT is less than the buffer size BS, u(KmodBS) is zero. Then x(K) is stored in buffer element u(KmodBS) (Step S25), and the count CT is increased by one (S26).

Step S27 decides whether the count CT exceeds the buffer size BS. If yes, the average is obtained by dividing the sum S by the buffer size BS; if no, it is obtained by dividing the sum S by the count CT. In this average, the most recent BS samples x(KmodBS), x((K−1)modBS), . . . , x((K−BS+1)modBS) all have the same weight, and samples which are older than x((K−BS+1)modBS), having been overwritten in the buffer, are not taken account of.

Figure 4:
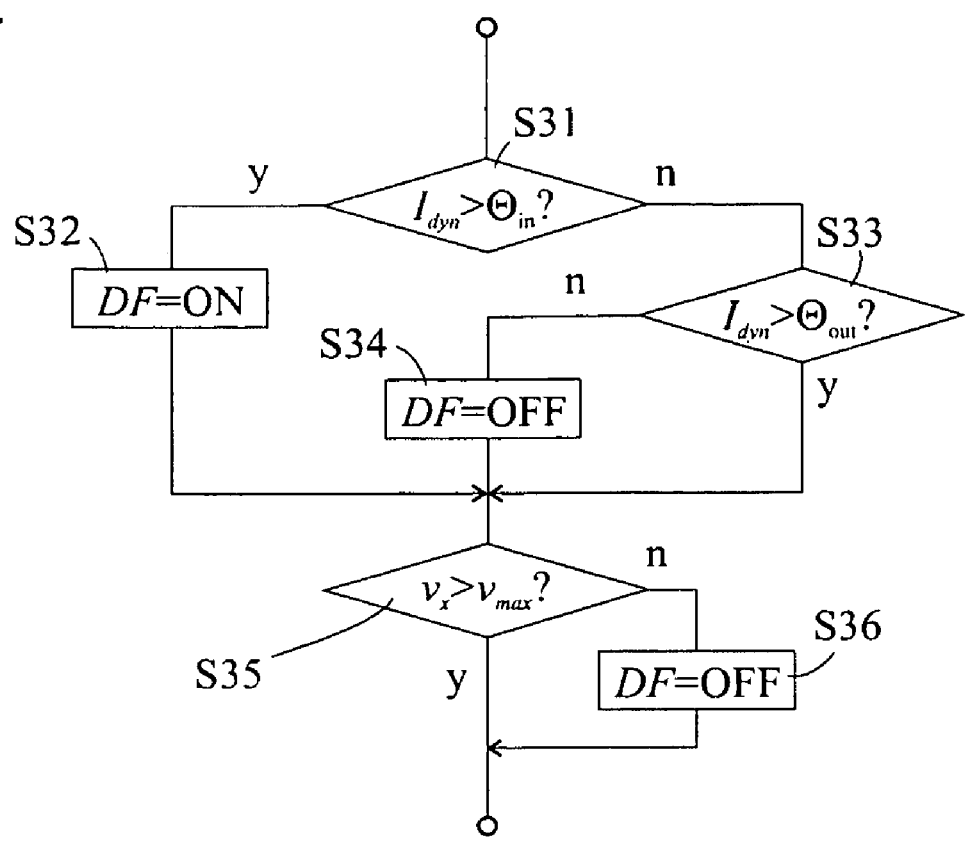
FIG. 4 is a flowchart showing in detail another step of the method of FIG. 2.

FIG. 4 illustrates the process of deciding on the dynamic flag DF based on the dynamic index Idyn in steps S14 to S17 of FIG. 2. In a first step S31, the dynamic driving index Idyn(K) is compared to a first threshold Θin. If this threshold is exceeded, the dynamic driving flag DF is set to ON in step S32. If the threshold Θin is not exceeded in S31, Idyn is compared to a second threshold Θout in step S33. If this threshold Θout is not exceeded, either, the flag DF is set to OFF in step S34. Otherwise, DF is left unchanged.

In a subsequent step S35, the longitudinal speed vx is compared to a threshold vmax. If the threshold vmax is exceeded, the flag DF is left unchanged; else it is set to OFF in step S36. In this way, the flag DF can be set to OFF immediately if the speed is low, indicating maneuvers such as parking maneuvers, although the driving index Idyn may be well above the threshold Θin after a prolonged period of speedy driving.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A method for controlling at least one active subsystem in a chassis of a vehicle, comprising the steps of:
   evaluating a driving style based at least in part on data representative of an acceleration of the vehicle, said data is normalized with respect to an acceleration threshold;
   setting an operating state of said at least one active subsystem according to the driving style; and
   calculating a scalar driving style descriptor based on said acceleration; and
   judging the driving style by comparing the scalar driving style descriptor to a threshold,
   wherein said calculating the scalar driving style descriptor comprises the step of calculating a sum of squares of a normalized longitudinal acceleration and a normalized lateral acceleration of the vehicle.

2. The method of claim 1, wherein said at least one active subsystem is a drive controller.

3. The method of claim 1, wherein said at least one active subsystem is a suspension controller.

4. The method of claim 1, wherein said at least one active subsystem is a steering controller.

5. The method of claim 1, wherein said at least one active subsystem is a transmission controller.

6. The method of claim 1, wherein said at least one active subsystem is an engine controller.

7. The method of claim 1, wherein said at least one active subsystem is a brake controller.

8. The method of claim 1, further comprising the step of estimating the normalized longitudinal acceleration and the normalized lateral acceleration of the vehicle.

9. A method for controlling at least one active subsystem in a chassis of a vehicle, comprising the steps of:
   evaluating a driving style based at least in part on data representative of an acceleration of the vehicle, said data is normalized with respect to an acceleration threshold;
   setting an operating state of said at least one active subsystem according to the driving style;
   estimating a rate of change in the acceleration;
   accounting for said rate of change in said evaluating;
   calculating a first term representative of average accelerations and a second term representative of average rates of change of the acceleration;

calculating a scalar driving style descriptor by forming a sum of said first term and second term; and judging the driving style by comparing the scalar driving style descriptor to a threshold.

10. The method of claim 9, wherein said first term is an average of accelerations weighted with a weighting factor progressively related to a speed of the vehicle.

11. The method of claim 9, wherein said second term is an average of rates of change weighted with a weighting factor progressively related to a speed of the vehicle.

12. The method of claim 9, wherein said sum of said first term and said second term is a weighted sum; and determining weighting factors based at least in part on steering wheel operation.

13. The method of claim 12, wherein said weighting factors are determined according to the rate of change of a steering wheel angle.

14. The method of claim 9, wherein said at least one active subsystem is a suspension controller.

15. The method of claim 9, wherein said at least one active subsystem is a steering controller.

16. The method of claim 9, wherein said at least one active subsystem is a drive controller.

17. The method of claim 9, wherein said at least one active subsystem is a transmission controller.

18. A motor vehicle, comprising:

at least one active subsystem; and a controller adapted to control the at least one active subsystem, said controller configured to:

evaluate a driving style based at least in part on data representative of an acceleration of the vehicle, said data being normalized with respect to an acceleration threshold;

set an operating state of said at least one active subsystem according to the driving style;

calculating a first term representative of average accelerations and a second term representative of average rates of change of the acceleration;

calculating a scalar driving style descriptor by forming a sum of said first term and second term; and judging the driving style by comparing the scalar driving style descriptor to a threshold.

\* \* \* \* \*